(12) United States Patent
Larsen (10) Patent No.: US 9,838,062 B2
(45) Date of Patent: Dec. 5, 2017

(54) WIRELESS HEADSET SYSTEM WITH TWO DIFFERENT RADIO PROTOCOLS

(71) Applicant: GN Netcom A/S, Ballerup (DK)

(72) Inventor: Leo Larsen, Ballerup (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 14/981,140

(22) Filed: Dec. 28, 2015

(65) Prior Publication Data

US 2016/0191093 A1    Jun. 30, 2016

(30) Foreign Application Priority Data

Dec. 30, 2014   (DK) ................................ 2014 00756

(51) Int. Cl.
*H04M 1/00* (2006.01)
*H04B 1/3827* (2015.01)
(Continued)

(52) U.S. Cl.
CPC .......... *H04B 1/385* (2013.01); *H04M 1/6066* (2013.01); *H04W 72/10* (2013.01); *H04B 2001/3866* (2013.01); *H04M 1/72505* (2013.01); *H04M 1/72511* (2013.01); *H04M 2250/02* (2013.01); *H04M 2250/08* (2013.01);
(Continued)

(58) Field of Classification Search
CPC ........... H04B 1/385; H04B 2001/3866; H04M 1/6066; H04M 2250/02; H04M 2250/08; H04M 1/72505; H04M 1/72511; H04W 72/02; H04W 72/10; H04W 88/06; H04W 88/10
See application file for complete search history.

(56) References Cited

U.S. PATENT DOCUMENTS 7,486,965 B1 * 2/2009 Hollister ............... H04W 88/06
455/552.1
2011/0269502 A1   11/2011 Clark et al.

FOREIGN PATENT DOCUMENTS

EP       2541882       1/2013
KR    20020074750    10/2002
(Continued)

OTHER PUBLICATIONS

Danish Patent Office Search Report for Danish patent application No. PA201400756 dated Jul. 30, 2015.

*Primary Examiner* — Thanh Le
(74) *Attorney, Agent, or Firm* — Altera Law Group, LLC (57) ABSTRACT

A headset system comprising a headset and a base station. Each of said headset and base station comprises a transceiver configured to transmit radio signals between said headset and said base station according to a first wireless communication protocol, and each of said headset and base station further comprises a transceiver configured to transmit radio signals between said headset and said base station according to a second wireless communication protocol. At least one of said headset and said base station further comprises selecting means, such as a protocol selector configured to select one of said first and second wireless communication protocols for transmission of radio signals between said headset and said base station. The protocol selector is adapted to select the first wireless communication protocol for transmission of voice communication and the second wireless communication protocol for transmission of media content.

18 Claims, 4 Drawing Sheets

(51) Int. Cl.
  *H04M 1/60* (2006.01)
  *H04W 72/10* (2009.01)
  *H04M 1/725* (2006.01)
  *H04W 72/02* (2009.01)
  *H04W 88/06* (2009.01)
  *H04W 88/10* (2009.01)

(52) U.S. Cl.
  CPC ............ *H04W 72/02* (2013.01); *H04W 88/06* (2013.01); *H04W 88/10* (2013.01)

(56) References Cited

FOREIGN PATENT DOCUMENTS

| WO | WO 2005/032109 | 4/2005 |
| WO | WO 2005/064964 | 7/2005 |
| WO | WO 2010/099453 | 9/2010 |

* cited by examiner

WIRELESS HEADSET SYSTEM WITH TWO DIFFERENT RADIO PROTOCOLS

TECHNICAL FIELD

The invention relates to a headset system comprising a headset and a base station, wherein each of said headset and base station comprises a transceiver configured to transmit radio signals between said headset and said base station according to a first wireless communication protocol, and that each of said headset and base station further comprises a transceiver configured to transmit radio signals between said headset and said base station according to a second wireless communication protocol; and at least one of said headset and said base station further comprises a protocol selector configured to select one of said first and second wireless communication protocols for transmission of radio signals between said headset and said base station.

BACKGROUND ART

Today, wireless headsets are rapidly replacing standard telephones. A wireless headset typically communicates with a base station by the transmission of radio signals between the headset and the base station. Thus, a headset system can be said to comprise a headset and a base station. The base station may be connected to e.g. a telephone line or a computer having a communication program such as Microsoft Lync (Skype for Business) installed. The wireless communication between the headset and the base station of a headset system may use any of a number of different wireless communication protocols, such as Digital Enhanced Cordless Telecommunications (DECT), Bluetooth, Wireless Fidelity (Wi-Fi), or Ultra Wideband (UWB). At present DECT seems to be the most widely used wireless communication protocol for this application.

In e.g. office environments and call centres, i.e. so-called high-density installations, a large number of headset systems, each one comprising a headset and a base station, will typically be used within a limited geographical area. This is possible because each of the wireless communication protocols has a certain bandwidth allowing a given number of channels to be used simultaneously. As an example, in Europe the DECT frequency band is 1880 MHz-1900 MHz, which allows the use of 10 carriers with 12 time slots to be used in each direction, i.e. up and down stream. Thus, up to 120 channels can be provided in the European DECT spectrum, which means that up to 120 headset systems can be used simultaneously in the same area. In the US and Canada the DECT frequency band is 1920 MHz-1930 MHz, which allows the use of 5 carriers and provides up to 60 channels.

Although some of the other wireless communication protocols, e.g. Bluetooth, may provide a somewhat higher number of channels, the number is still limited to a level that may not be enough for large office buildings or large call centres. On top of this, the increased use of wide band speech in e.g. Microsoft Office Communicator further reduces the number of available channels, since a higher bandwidth is needed for each channel. Thus in Europe the number of available DECT wideband channels is only 60, while in the US and Canada it is reduced to 30.

A headset system comprising two different transceiver pairs as mentioned under Technical Field is known from EP 2 541 882. This system reduces density problems by providing the ability to transmit according to two different radio protocols.

DISCLOSURE OF INVENTION

It is an object of the invention to provide a headset system that improves the utilization of the different wireless protocols within the same headset system.

According to the invention a headset system comprising a headset and a base station, wherein each of said headset and base station comprises a transceiver configured to transmit radio signals between said headset and said base station according to a first wireless communication protocol, and that each of said headset and base station further comprises a transceiver configured to transmit radio signals between said headset and said base station according to a second wireless communication protocol; and at least one of said headset and said base station further comprises selecting means configured to select one of said first and second wireless communication protocols for transmission of radio signals between said headset and said base station, wherein the protocol selector is adapted to select the first wireless communication protocol for transmission of voice communication and the second wireless communication protocol for transmission of media content.

Each of the first and second wireless communication protocols may be selected from the group of wireless communication protocols comprising DECT (Digital Enhanced Cordless Telecommunications), Bluetooth, Wi-Fi (Wireless Fidelity) and UWB (Ultra Wideband).

In one embodiment, the first wireless communication protocol is DECT, and the second wireless communication protocol is Bluetooth. DECT is in general accepted as a more secure connection that is more difficult to eavesdrop than Bluetooth. Thus, the DECT channels can be reserved for voice communication while Bluetooth can be utilized for media playing of music etc.

When a DECT headset system is active, i.e. a wireless connection has been established between the headset and the base station, information used for synchronizing the headset and the base station to each other is transmitted from the base station to the headset in the time slot assigned for downstream transmission of this connection.

However, even when a headset is idle, i.e. when no call is taking place, such synchronization information is still transmitted from the base station to the headset in order to enable the headset to still be synchronized with the base station, so that the connection can be re-established without delay when a new call arrives or is requested from the headset. This synchronization information is transmitted in the form of a so-called dummy bearer, which still occupies a part of a DECT channel timing wise.

According to an embodiment of the invention, synchronization information for the first wireless communication protocol is transmitted between the base station and the headset via the second wireless communication protocol. Thus, the synchronization does not occupy any channels or increase the density problems when there is no voice communication.

According to an embodiment, the headset comprises a rechargeable battery, wherein the headset system comprises a charging cradle on which the headset can be docked, whereby the headset battery can be recharged.

According to an embodiment, synchronization information for the first and/or second wireless communication protocols are transmitted out-of-band, such as by hard wire communications instead of wireless, between the base station and the headset via electric terminals, when the headset is docked on the charging cradle.

The charging cradle may be comprised by the base station.

When at least one of said headset and said base station further comprises a digital signal processor configured to perform digital signal processing of signals to be transmitted according to said first wireless communication protocol as well as signals to be transmitted according to said second wireless communication protocol, i.e. a common digital signal processor is used for both protocols, it becomes possible also to use a codec for encoding and decoding the signals for both protocols.

Also disclosed is a headset system for transmitting communications of having different forms, including voice and media, or having different bandwidth requirements comprising: a headset and a base station
wherein each of said headset and base station include a transceiver configured to transmit radio signals carrying between said headset and said base station according to a first wireless communication protocol, and that
each of said headset and base station further include a transceiver configured to transmit radio signals between said headset and said base station according to a second wireless communication protocol; and
at least one of said headset and said base station further comprises protocol selector configured to select one of said first and second wireless communication protocols for transmission of radio signals between said headset and said base station, wherein the protocol selector is adapted detect the form of communication (ie voice/non voice/broad/narrow band/secure/insecure/to be transmitted to select the first wireless communication protocol for transmission of voice communication and the second wireless communication protocol for transmission of non-voice media content.

Also disclosed is a system wherein said first protocol is a secure voice communications protocol and wherein said second protocol is of equal or less secure broadband channel.

Also disclosed is a system further including an open channel detector which checks the availability of an available frequency in said first secure protocol, and if no frequency is available transmits voice communications over said second protocol.

Also disclosed is a notifier which reports the use of said second less secure protocol for voice communication.

Also disclosed is a system wherein said notifier transmits an audible or visual warning signal into the headset or base station or both, prior to commencing and/or during voice communication over said less secure voice protocol.

Also disclosed is a system wherein the first communication protocol requires synchronization between the headset and base station prior to commencement of communication, and wherein the synchronization is performed on said second communications protocol, to minimize utilization of said first communications protocol and to maintain use of said first communications protocol in an immediate ready state.

Also disclosed is a system wherein the first communication protocol requires a linked key transmitted between the headset and base station and wherein said linked key is transmitted over said second communication protocol to enhance security of said first communication protocol.

Also disclosed is a system wherein the second communication protocol requires a linked key transmitted between the headset and base station and wherein said linked key is transmitted over said first communication protocol to enhance security of said second communication protocol.

Also disclosed is a method minimizing radio congestion in a high density radio environment of base stations and wireless headsets, comprising any or all the steps of in any order:

a. configuring the base station and headsets with transceivers capable of communicating over first and second communications protocols, said first protocol being equal to or more secure than said second protocol;
b. transmitting voice communications between said headset and base station over said first protocol if a channel is available;
c. transmitting non voice communication between said headset and base station over said second protocol;
d. if a channel is not available for voice of said first communications protocol, then transmitting voice communication over said second protocol, but only after transmitting a warning to the headset user of the use of said second less secure protocol.

Also disclosed is a method wherein said first communications protocol is synchronized using the second communications protocol.

Also disclosed is a method wherein said first communication protocol requires the exchange of linked key and where said key is transmitted over said second communications protocol Also disclosed is a method of operating the system disclosed.

BRIEF DESCRIPTION OF THE DRAWINGS

Embodiments of the invention will now be described more fully below with reference to the drawings, in which.

MODES FOR CARRYING OUT THE INVENTION

Figure 1A:
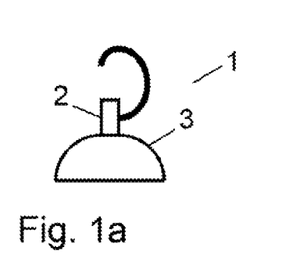
FIGS. 1a and 1b show an example of a headset system comprising a headset and a base station.
Figure 1B:
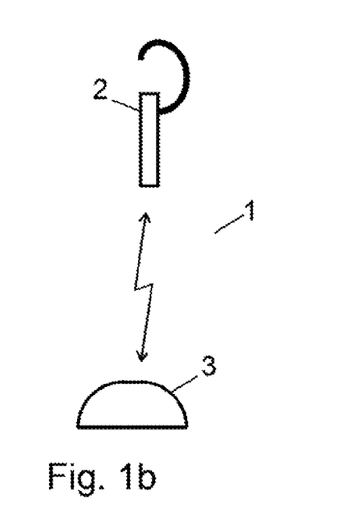

FIGS. 1a and 1b show an example of a headset system 1 in which the invention may be used. The headset system 1 comprises a headset 2 and a base station or base unit 3. In FIG. 1a the headset system is shown in a passive state in which the headset 2 is placed in the base station 3. In FIG. 1b the headset 2 has been moved away from the base station 3, and a connection has been established between the headset 2 and the base station 3 by transmitting radio signals between them. The transmitted radio signals may represent sound (speech), data or control signals. The wireless communication between the headset 2 and the base station 3 may use any of a number of different wireless communication protocols, such as Digital Enhanced Cordless Telecommunications (DECT), Bluetooth, Wireless Fidelity (Wi-Fi), or Ultra Wideband (UWB). At present DECT seems to be the most widely used wireless communication protocol for this application, and thus in the following a DECT headset system will be used as an example.

Figure 2:
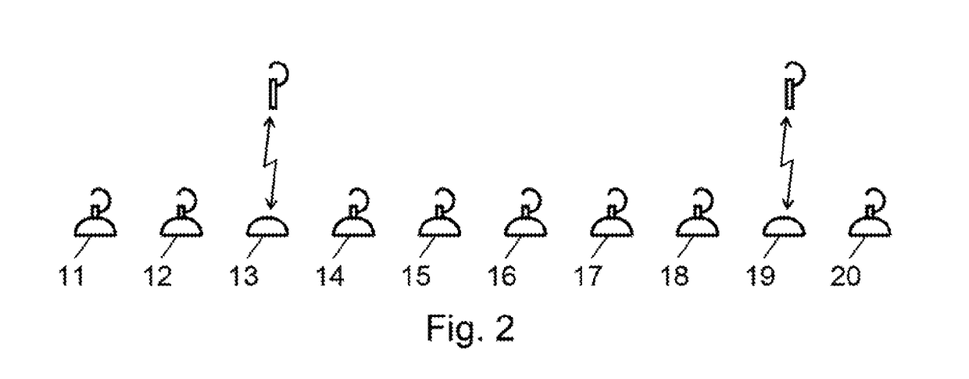
FIG. 2 illustrates an office environment or a call centre with a large number of headset systems.

FIG. 2 illustrates an office environment or a call centre, i.e. a so-called high-density installation, where a large number of headset systems, each one comprising a headset and a base station, will typically be used within a limited geographical area. This is possible because DECT as well as the other wireless communication protocols has a certain bandwidth allowing a given number of channels to be used simultaneously. In Europe the DECT frequency band is 1880 MHz-1900 MHz, which allows the use of 10 carriers with 12 time slots to be used in each direction, i.e. up and down stream. Thus, up to 120 channels can be provided in the European DECT spectrum, which means that up to 120 headset systems can be used simultaneously in the same area. In the US and Canada the DECT frequency band is 1920 MHz-1930 MHz, which allows the use of 5 carriers and provides up to 60 channels. In FIG. 2 ten headset systems 11, 12, 13, 14, 15, 16, 17, 18, 19 and 20 are shown for illustrational purposes, of which the two headset systems 13 and 19 are used for communication. Thus, in this case two of the available channels are occupied. However, in many installations also the docked passive headset systems may occupy a channel.

Figure 3:
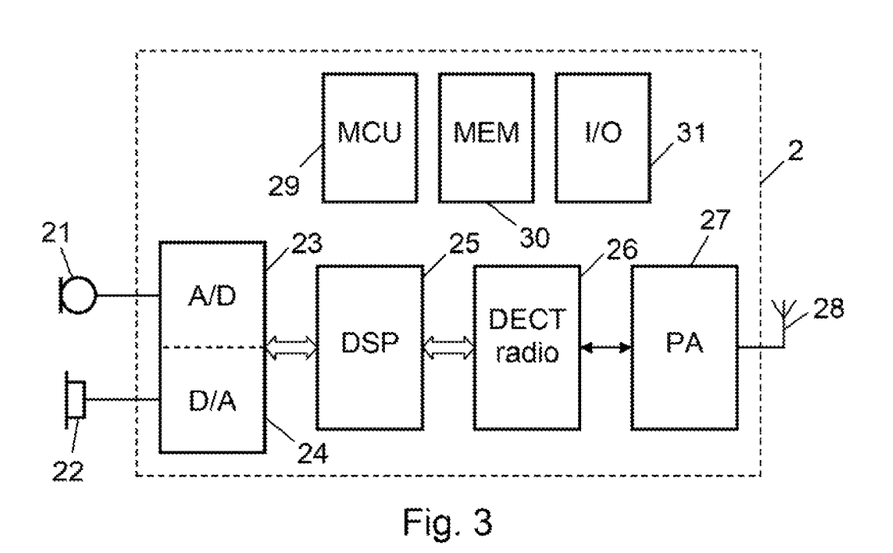
FIG. 3 shows an example configuration of the headset of FIGS. 1a and 1b.

FIG. 3 illustrates an example of a configuration of the headset 2. The headset 2 includes a microphone 21 and a loudspeaker 22. The microphone 21 is connected to an A/D-converter 23 that converts an analogue voice signal received by the microphone 21 to digital signals that can be processed by the digital signal processor 25, and similarly the loudspeaker 22 is connected to a D/A-converter 24 that converts digital signals from the digital signal processor 25 to analogue signals that can be reproduced by the loudspeaker 22. The digital signal processor 25 performs different tasks such as encoding/decoding (codec), noise reduction and echo control. The signal processor 25 is connected to a DECT radio circuit 26 (transceiver), which again is connected through a power amplifier 27 to the antenna 28. The headset 2 also comprises a microcontroller unit 29, memory 30 and input/output circuits 31 connected to e.g. push buttons and light emitting diodes.

Figure 4:
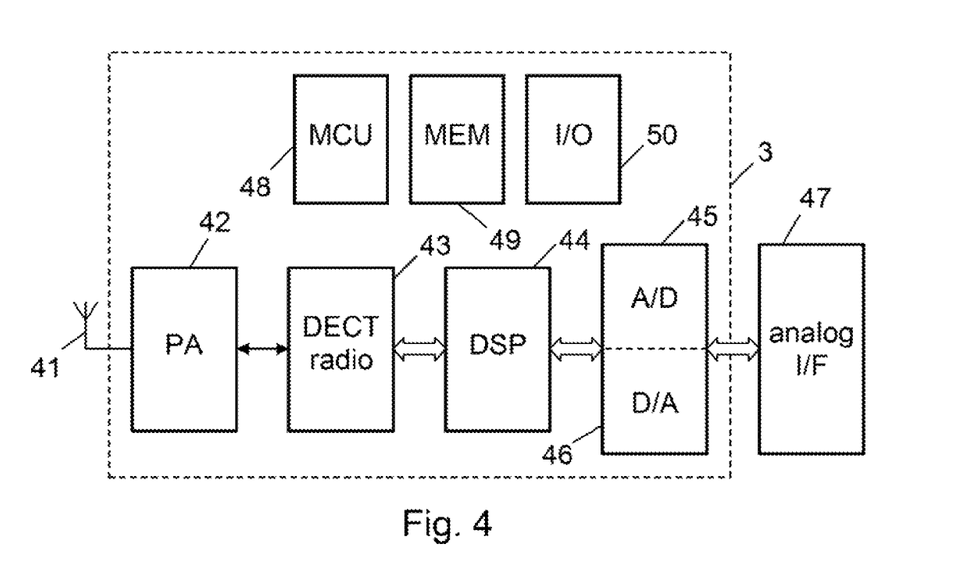
FIG. 4 shows an example configuration of the base station of FIGS. 1a and 1b.

Similarly, FIG. 4 illustrates an example of a configuration of the base station 3. An antenna 41 for receiving radio signals emitted from the antenna 28 of the headset 2 and transmitting radio signals the other way is connected through a power amplifier 42 to a DECT radio circuit 43 (transceiver). Like the headset 2, the base station 3 also has a digital signal processor 44 for performing different tasks such as encoding/decoding (codec), noise reduction and echo control. The digital signal processor 44 may be connected via A/D-converter 45 and D/A-converter 46 to an analogue interface 47 that may interface the base station to a telephone line. Alternatively, the digital signal processor 44 may be connected (e.g. via a USB interface) to a computer having a communication program such as Microsoft Lync (Skype for Business) installed. The base station 3 also comprises a microcontroller unit 48, memory 49 and input/output circuits 50 connected to e.g. push buttons and light emitting diodes.

When a wireless connection is to be established between the headset 2 and the base station 3, one of the microcontroller units, i.e. either the microcontroller unit 29 in the headset 2 or the microcontroller unit 48 in the base station 3, checks by activating the receiver part of the corresponding DECT radio circuit which DECT channels are already occupied by other headset systems, DECT telephones or other DECT equipment in the area, and from this information it determines a channel that is available for use by this headset system. A radio connection between the headset and the base station is then established using this available channel.

As mentioned above, the number of available channels in DECT is limited, and the number is further reduced due to the increased use of wide band speech in e.g. Microsoft Lync, since a higher bandwidth is needed for each channel. Thus in Europe the number of available DECT wideband channels is only 60, while in the US and Canada it is reduced to 30. Especially in such cases the number of available channels may not be sufficient for large office environments or call centres. Although some of the other wireless communication protocols, e.g. Bluetooth, may provide a somewhat higher number of channels, the number is still limited to a level that may not be enough for large office buildings or large call centres.

Figure 5:
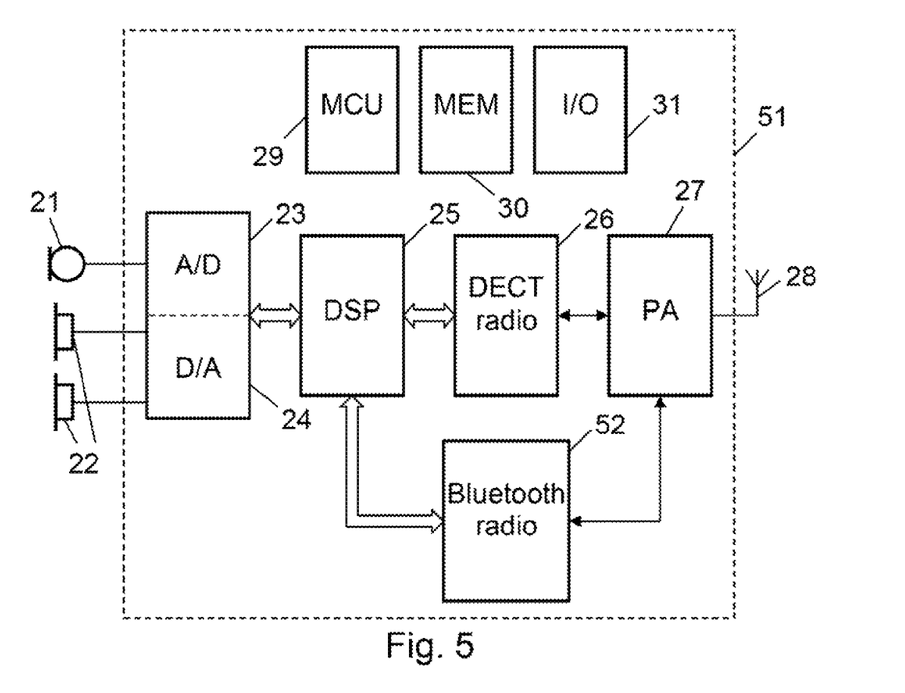
FIG. 5 shows an example configuration of a headset configured to transmit and receive radio signals according to two different wireless communication protocols.
Figure 6:
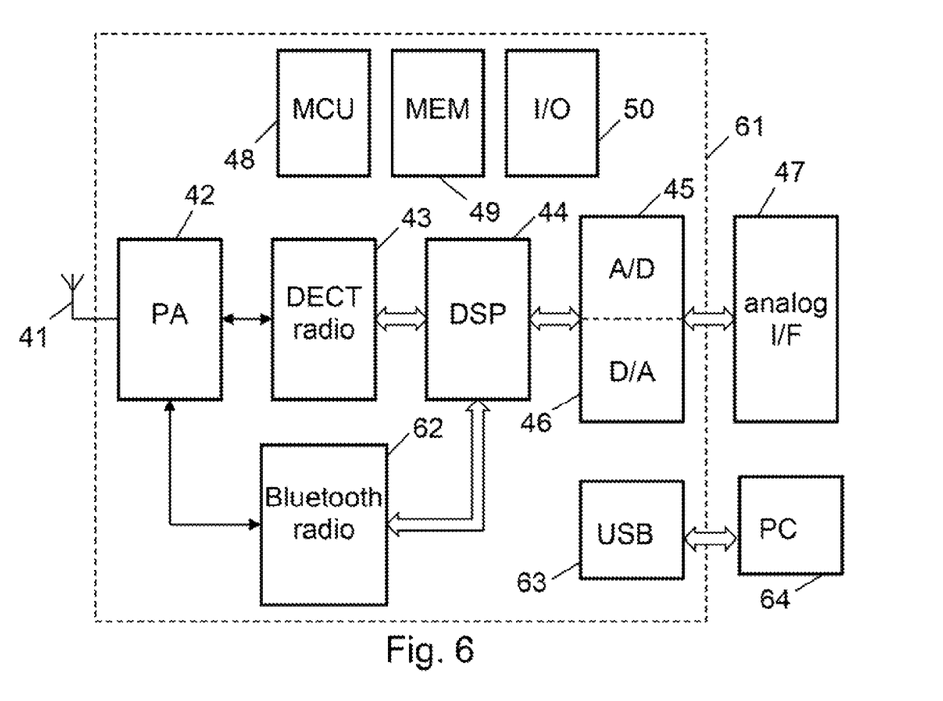
FIG. 6 shows an example configuration of a base station configured to transmit and receive radio signals according to two different wireless communication protocols.

A solution to this problem is shown in FIGS. 5 and 6 illustrating a modified headset 51 and a modified base station 61. The headset 51 differs from the headset 2 of FIG. 3 in that in addition to the DECT radio circuit 26 it also comprises a Bluetooth radio circuit 52, so that the headset can now communicate via Bluetooth as well as via DECT. The Bluetooth connection can be according to class 1, which ensures a range of up to 100 meters. The Bluetooth frequency range is 2400-2480 MHz. In FIG. 5, the digital signal processor 25 is used for both the DECT branch and the Bluetooth branch of the headset, but it could also be possible that each one of the two branches has its own digital signal processor. Similarly, the power amplifier 27 and the antenna 28 are used for both branches, but it is also possible that each branch uses its own power amplifier and/or its own antenna. The headset 51 of FIG. 5 also differs from the headset 2 of FIG. 3 by being a stereo headset with two loudspeakers/earphones 22, whereby it is more suitable for music listening.

Similarly, the base station 61 differs from the base station 3 in that it comprises a Bluetooth radio circuit 62 in addition to the DECT radio circuit 26, so that it can communicate with the headset via Bluetooth as well as via DECT. Also here the digital signal processor 44 as well as the power amplifier 42 and the antenna 41 are used for both the DECT branch and the Bluetooth branch of the base station, while it is also here possible to have these components separate for each branch. In addition, the base station 61 has a USB port 63, which by means of a USB cable can be connected to a personal computer 64. Hereby, the headset system can be used for voice communication via a softphone, f. ex. Microsoft Lync, installed on the personal computer. Also, music or multimedia audio may be streamed from the computer to the USB port 63 of the base station 61.

As mentioned, the DECT branch and the Bluetooth branch of the base station as well as the headset can either use a common digital signal processor or two separate digital signal processors. Bluetooth high-end chipsets today typically provide considerable digital signal processor resources. Thus, it can be advantageous to use this processor as a common digital signal processor, which will allow the use of common codec for Bluetooth and DECT. Such codec could possibly also be able to take wideband DECT into a normal DECT timeslot, which would further increase the number of available channels.

The following scenarios explain how the embodiment of the headset system works. The base station 61 is connected to a personal computer with a softphone installed.

Scenario 1—Headset is Docked

There is a Bluetooth link between the headset Bluetooth radio 52 and the base station Bluetooth radio 62. There is no link between the headset DECT radio 26 and the base station DECT radio 43. Most DECT systems require that base stations and remote stations (such as handsets) must be synchronized. Synchronization information between the DECT radios 26, 43 are exchanged via base station terminals (hardwire) or via the Bluetooth link, whereby a DECT audio link can be established without delay when needed.

Scenario 2—Headset is Undocked and the User is Listening to Streaming Audio

A user is wearing the headset 51 and is listening to music, which is streamed via the USB port and the Bluetooth link to the headset. There is no DECT link between the headset 51 and the base station 61. However, the base station DECT radio 43 "listens" to DECT radio frequency signals emitted by other DECT systems in the environment so that the microcontroller unit 48 can detect which DECT channels are occupied by other systems, and thus it can also send information via the Bluetooth link to the headset 51 regarding available channels in addition to the synchronization information. Since Blue Tooth is short range, even in a high density environment, there likely to be open channels. This reduces the delay of re-establishing a DECT link/connection between the two DECT transceivers 26 and 43 when a new call arrives or is requested by the headset 51. When there is an incoming call, f. ex. via the softphone, information is sent from the base station 61 via the Bluetooth link to the headset 51. If the user accepts the incoming call, f. ex. by pressing a button on the headset 51, a signal is returned to the base station 61, where after the two DECT radios 43, 26 starts transmitting and establishes a DECT link. The music streaming is stopped either by the computer, the base station 61 or the headset 51, whereby the user can have the voice call undisturbed.

Scenario 3—The User is Ending a Voice Call

If a user is having a voice call via a DECT link and ends it, the two DECT radios stops transmitting and exchanges synchronization information via the Bluetooth link.

In the example described above, the two wireless communication protocols used are DECT and Bluetooth. However, other communication protocols than DECT and Bluetooth could be used instead of one or both of these. Some examples are Wireless Fidelity (Wi-Fi) in the 2.4, 3.6 or 5 GHz frequency bands and Ultra Wideband (UWB) in the frequency range of 3.1 to 10.6 GHz.

When the headset system is configured to use two different wireless communication protocols, i.e. in this case DECT and Bluetooth, an extra level of security could also be added to the solution. The level of security of each link (DECT and Bluetooth) is already very high, but by taking advantage of having two technologies running in parallel, additional exchange of link keys could be implemented. Keys for improved DECT security could be sent over Bluetooth, and keys for improved Bluetooth security could be sent over DECT. This would make it very difficult to even consider ways of eavesdropping a call.

Figure 7:
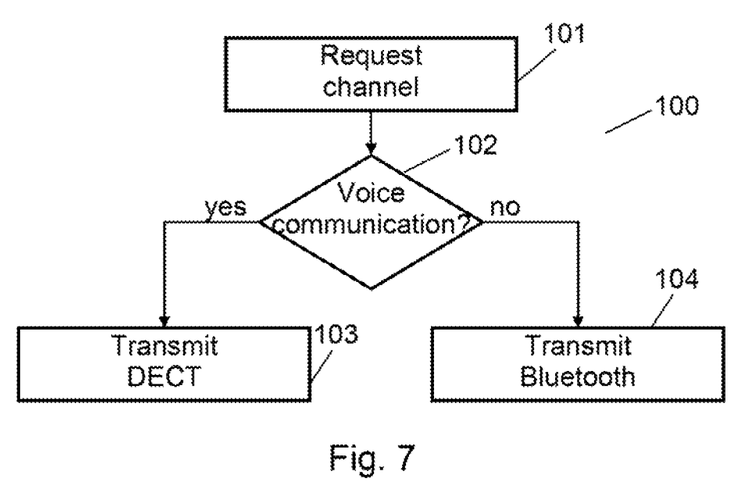
FIG. 7 shows a flow chart of a method of transmitting radio signals between a headset and a base station.

FIG. 7 shows a flow chart 100 illustrating a method according to the solution described above. When a connection between a headset and a base station is needed, the headset system requests a channel in step 101. It is then checked in step 102 whether the channel is to be used for voice communication or not. This can be done in different ways. If a signal comes via the analogue interface 47, which is connected to a desktop phone, the headset system knows, it is a signal for voice communication and will establish a DECT link, if the call is accepted. If a there is an incoming call on the softphone, a "call notification" is sent to the USB port, and the headset system will know. If a DECT channel is available, radio signals are then transmitted in step 103 between the headset and the base station according to the DECT protocol. However, if there are no DECT channels available, no link is established. Alternatively, the headset switches to Bluetooth and radio signals are then transmitted in step 104 between the headset and the base station according to the Bluetooth protocol. In this case, the user may be warned for using a "less safe wireless connection". Audio streaming from f. ex. Windows Media Player™ or YouTube™, comprises no "call information" and will be transmitted from the base station 61 via the Bluetooth link to the headset 51. Thus, the headset system automatically selects the DECT protocol, when it is used for voice communication and Bluetooth for other use, such as music listening. As the available DECT channels are prioritised and only used for voice communication, density problems due to other use are reduced. Furthermore, DECT is regarded as a more secure protocol than Bluetooth, whereby it makes sense to use DECT for voice communication and Bluetooth for other uses, such as music listening.

Although various embodiments of the present invention have been described and shown, the invention is not restricted thereto, but may also be embodied in other ways within the scope of the subject matter defined in the following claims.

The invention claimed is:

1. A headset system comprising a headset and a base station, wherein
    each of said headset and base station comprises a transceiver configured to transmit radio signals between said headset and said base station according to a first wireless communication protocol, and that
    each of said headset and base station further comprises a transceiver configured to transmit radio signals between said headset and said base station according to a second wireless communication protocol; and
    at least one of said headset and said base station further comprises protocol selector configured to select one of said first and second wireless communication protocols for transmission of radio signals between said headset and said base station, wherein the protocol selector is adapted to select the first wireless communication protocol for transmission of voice communication and the second wireless communication protocol for transmission of media content; and further including an open channel detector which checks the availability of an available frequency in said first protocol, and if no frequency is available transmits voice communications over said second protocol.

2. A headset system according to claim 1, wherein each of said first and second wireless communication protocols is selected from the group of wireless communication protocols comprising DECT, Bluetooth, Wi-Fi and UWB.

3. A headset system according to claim 2, wherein said first wireless communication protocol is DECT and said second wireless communication protocol is Bluetooth.

4. A headset system according to claim 1, wherein synchronization information for the first wireless communication protocol is transmitted between the headset and the base station via the second wireless communication protocol.

5. A headset system according to claim 1, wherein the headset comprises a rechargeable battery, and wherein the headset system comprises a charging cradle on which the headset can be docked, whereby the headset battery can be recharged.

6. A headset system according to claim 5, wherein synchronization information for the first and/or second wireless communication protocols are transmitted out-of-band between the base station 61 and the headset 51 via electric terminals, when the headset 51 is docked on the charging cradle.

7. A headset system according to claim 5, wherein the charging cradle is comprised by the base station.

8. A headset system according to claim 1, wherein at least one of said headset and said base station further comprises a digital signal processor configured to perform digital signal processing of signals to be transmitted according to said first wireless communication protocol as well as signals to be transmitted according to said second wireless communication protocol.

9. The system of claim 1 further including a notifier which reports the use of said second protocol for voice communication.

10. A headset system for transmitting communications of having different forms, including voice and media, or having different bandwidth requirements comprising:
   a headset and a base station,
   wherein each of said headset and base station include a transceiver configured to transmit radio signals carrying between said headset and said base station according to a first wireless communication protocol, and that each of said headset and base station further include a transceiver configured to transmit radio signals between said headset and said base station according to a second wireless communication protocol; and
at least one of said headset and said base station further comprises protocol selector configured to select one of said first and second wireless communication protocols for transmission of radio signals between said headset and said base station, wherein the protocol selector is adapted detect the form of communication to be transmitted to select the first wireless communication protocol for transmission of voice communication and the second wireless communication protocol for transmission of non-voice media content; further including an open channel detector to determine if a channel is available on said first protocol; wherein said first protocol is more secure than said second protocol; and further including notifier which reports the use of said second less secure protocol for voice communication when said detector determines that a channel is not available on said first protocol.

11. The system of claim 10 wherein when said detector determines that no communications channel is available over the first communications protocol, it transmits a warning to the user, over the second communications protocol.

12. The system of claim 11 wherein the warning advises the user that communications are less secure.

13. The system of claim 12 wherein said notifier transmits an audible warning signal into the headset prior to commencing voice communication over said less secure voice protocol.

14. The system of claim 10 wherein the first communication protocol requires synchronization between the headset and base station prior to commencement of communication, and wherein the synchronization is performed on said second communications protocol, to minimize utilization of said first communications protocol and to maintain use of said first communications protocol in an immediate ready state.

15. The system of claim 10 wherein the first communication protocol requires a linked key transmitted between the headset and base station and wherein said linked key is transmitted over said second communication protocol to enhance security of said first communication protocol.

16. The system of claim 10 wherein the second communication protocol requires a linked key transmitted between the headset and base station and wherein said linked key is transmitted over said first communication protocol to enhance security of said second communication protocol.

17. A headset system for transmitting communications of having different forms, including voice and media, or having different bandwidth requirements comprising:
   a headset and a base station,
   wherein each of said headset and base station include a transceiver configured to transmit radio signals carrying between said headset and said base station according to a first wireless communication protocol, and that each of said headset and base station further include a transceiver configured to transmit radio signals between said headset and said base station according to a second wireless communication protocol; and
at least one of said headset and said base station further comprises protocol selector configured to select one of said first and second wireless communication protocols for transmission of radio signals between said headset and said base station, wherein the protocol selector is adapted detect the form of communication to be transmitted to select the first wireless communication protocol for transmission of voice communication and the second wireless communication protocol for transmission of non-voice media content;
wherein the first communication protocol requires a linked key transmitted between the headset and base station and wherein said linked key is transmitted over said second communication protocol to enhance security of said first communication protocol.

18. The headset system of claim 17 wherein said first communications protocol requires synchronization, and wherein said synchronization takes place over said second communications protocol.

* * * * *